United States Patent [19]

Herd et al.

[11] E Re. 30,115

[45] Reissued Oct. 16, 1979

[54] BALANCED STEM FAIL-SAFE VALVE SYSTEM

[75] Inventors: David P. Herd, Houston; John W. McCaskill, Tyler, both of Tex.; Thomas W. Childers, Mandeville, La.

[73] Assignee: Exxon Production Research Company, Houston, Tex.

[21] Appl. No.: 870,956

[22] Filed: Jan. 19, 1978

Related U.S. Patent Documents

Reissue of:

[64] Patent No.: 3,933,338
Issued: Jan. 20, 1976
Appl. No.: 516,704
Filed: Oct. 21, 1974

[51] Int. Cl.[2] ..... F16K 31/126

[52] U.S. Cl. ..... 251/63.6; 137/236 R; 251/282; 251/327

[58] Field of Search ..... 137/236, 246.13; 91/461; 92/110; 251/14, 62, 63, 63.5, 63.6, 282, 327

[56] References Cited

U.S. PATENT DOCUMENTS

| | | | |
|---|---|---|---|
| Re. 27,789 | 10/1973 | Tillman | 251/327 |
| 1,153,973 | 9/1915 | Tacit et al. | 251/63 |
| 2,161,175 | 6/1939 | Laurent | 137/246.13 |
| 2,478,811 | 8/1949 | Downs | 251/327 |
| 3,086,745 | 4/1963 | Natho | 251/62 |
| 3,244,399 | 4/1966 | Jones et al. | 251/62 |
| 3,252,381 | 5/1966 | Gratzmuller | 91/461 |
| 3,335,642 | 8/1967 | Rosaen | 92/110 |

*Primary Examiner*—Martin P. Schwadron
*Assistant Examiner*—G. L. Walton
*Attorney, Agent, or Firm*—John S. Schneider

[57] ABSTRACT

A balanced stem fail-safe valve controls flow of fluids through a submerged pipeline. A closed subsea hydraulic pressure system operates or powers the valve. In the fail-safe mode the operating or reservoir pressure equals ambient sea pressure. A valve housing is arranged on the pipeline and a valve chamber is formed in the valve housing. A valve element is movable in the valve chamber between open and closed positions to control the flow of fluids through the pipeline. A first fluid pressure operable means is connected to the valve element to move the valve element to open position upon application of pump pressure to the first fluid pressure operable means. Electrically operated valves are used to direct the flow of power fluid to and from the valve. A spring is arranged in the valve housing to urge the valve element to its closed position in the event of power failure. A second fluid pressure operable means detached from the valve element engages the valve element upon application of operating or reservoir pressure to the second fluid pressure operable means to balance any unwanted force which might occur when the ambient pressure is greater than the internal valve pressure and permit the spring to close the valve element. The valve operator may be removable by means of a remotely operated manipulator for repair or replacement of the valve system or portions thereof.

24 Claims, 11 Drawing Figures

BALANCED STEM FAIL-SAFE VALVE SYSTEM

Matter enclosed in heavy brackets [ ] appears in the original patent but forms no part of this reissue specification; matter printed in italics indicates the additions made by reissue.

BACKGROUND OF THE INVENTION

The present invention generally concerns subsea valve apparatus. More particularly, the present invention concerns fail-safe hydraulically operated valves located on underwater pipelines or flow lines. In the operation of remote underwater valves a piston-operated valve stem reciprocates within a cylinder to open and close the (gate) valve element. In a single acting valve stem cylinder system, power fluid forces the piston in one direction (power stroke) and a spring returns the piston to its starting position (exhaust stroke). In a closed hydraulic power system in the fail-safe mode the operating or reservoir fluid pressure may be greater than the internal valve pressure. In that event the force due to the hydrostatic head i.e. the difference between the operating pressure and the valve pressure multiplyed by the piston stem diameter may be greater than the spring load in the piston operator and the valve may remain in the open position. The addition of another opposing valve stem, which is capable of contacting but is not connected to the valve element, balances the unwanted force permitting the spring to close the valve when the ambient pressure is greater than the internal valve pressure. When the internal valve pressure is greater than the ambient pressure the other valve stem does not engage the valve element which permits the valve system to function as a standard fail-safe valve.

SUMMARY OF THE INVENTION

In accordance with the teachings of the invention the balanced stem fail-safe valve system includes a valve housing arranged on a submerged pipeline. A valve chamber is arranged in the valve housing and a valve element, reciprocal in the valve chamber for controlling the flow of fluids through the pipeline, is arranged in the valve chamber. First fluid pressure operable means is arranged in the valve housing and is connected to the valve element for urging the valve element from a first to a second position thereof upon application of fluid pressure to the first fluid pressure operable means. Biasing means is arranged in the valve housing for urging the valve element from the second to the first position thereof. Second fluid pressure operable means is arranged in the valve housing and is detached from and capable of engaging the valve element to counterbalance the fluid pressure force applied to the first fluid pressure operable means.

DESCRIPTION OF THE PREFERRED EMBODIMENTS

Figure 1:
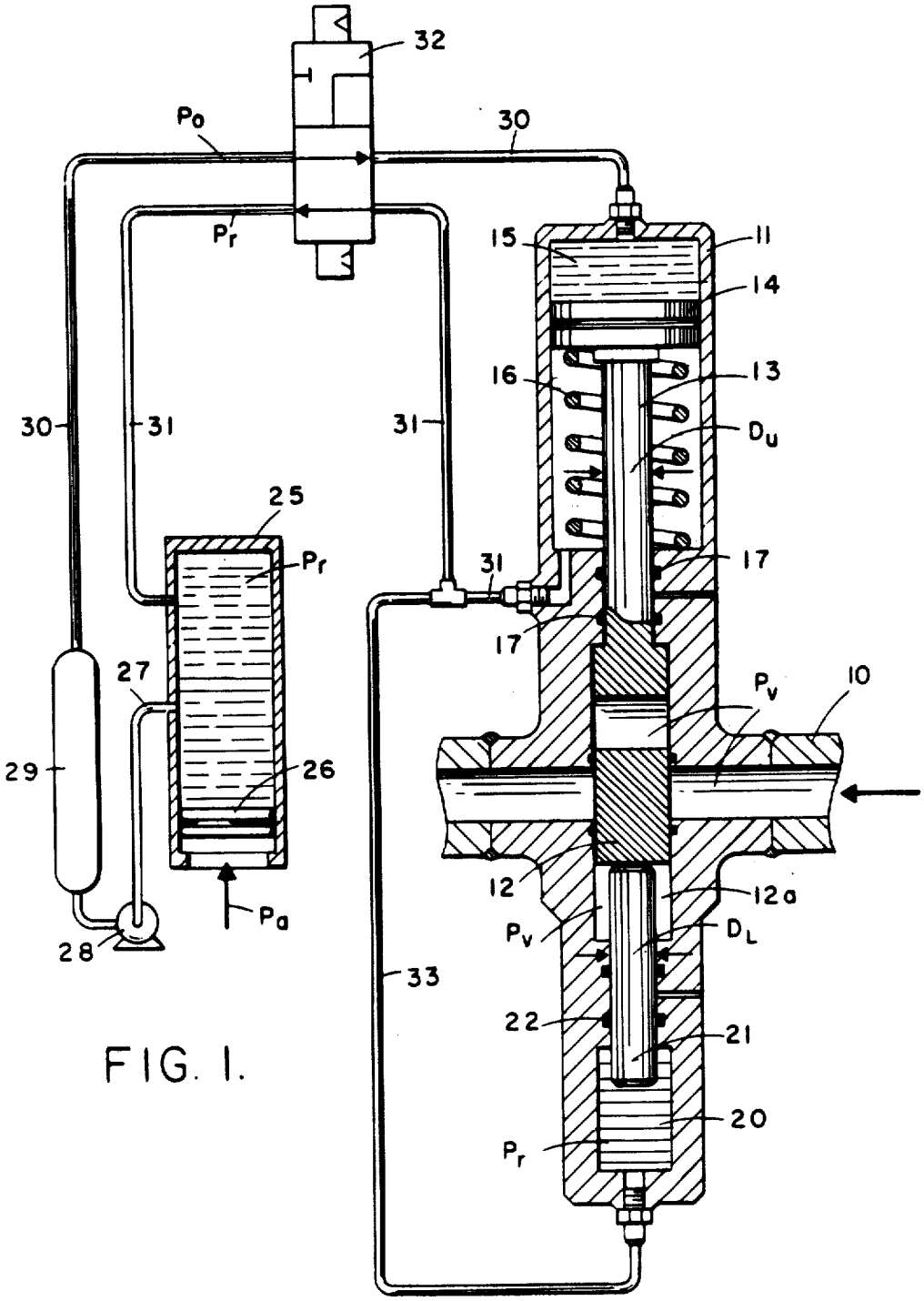
FIG. 1 is a schematic view of the valve system of the invention.

There is illustrated in FIG. 1 a submerged pipeline 10 on which is arranged a valve system which includes a valve housing 11. Within valve housing 11 a gate valve element or member 12 reciprocated in a valve chamber 12a to permit and prevent flow of fluids through pipeline 10. A valve stem 13 is valve housing 11 is connected to the top of valve member 12 at one end and to a piston 14 at the other end thereof. Piston 14 reciprocates in an actuator chamber 15 and has fixed power and exhaust strokes. A spring 16, arranged in chamber 15, urges piston 14 to move in its exhaust stroke. When valve member 12 is fully open, piston 14 is at the end of its power stroke and when valve member 12 is fully closed piston 14 is at the end of its exhaust stroke. Packing seals 17 surround and seal off fluid flow around valve stem 13.

Another actuator chamber 20 is formed in valve housing 11 below valve member 12 in which another valve stem 21 is arranged. Valve stem 21 can engage the underside of valve member 12 but is not connected thereto. Packing seals 22 surround and seal off fluid flow about valve stem 21.

When the valve system is located subsea, a submerged hydraulic power fluid reservoir 25 is provided with a floating piston 26 and compensated by seawater pressure. A diaphragm can be used instead of piston 26. A conduit or line 27 supplies a pump 28 with hydraulic control power fluid from reservoir 25. Pump 28 is operated by electrical power preferably supplied from the water's surface. An accumulator 29 is connected to pump 28 and to the power stroke end of actuator chamber 15 by means of a conduit 30. The purpose of the accumulator is to provide a supply of power fluid available for immediate delivery to chamber 15. Another conduit or line 31 connects the exhaust stroke end of actuator chamber 15 to reservoir 25. A solenoid-operated valve 32 is arranged on lines 30 and 31 to control the flow of fluids through those lines. Valve 32 is preferably a latching type solenoid valve which does not require continuous electrical power consumption. In one position of valve 32 both lines 30 and 31 are open as indicated in FIG. 1. As shown power fluid is being applied to piston 14 to initiate its power stroke. In another position of valve 32 flow from accumulator 29 through line 30 is blocked. Instead flow from chamber 15, through line 30 and valve 32 and line 31 is permitted. Another conduit or line 33 connects actuator chamber 20 below valve stem 21 and line 31 (line 33 thereby is connected to the exhaust stroke end of actuator chamber 15 and to reservoir 25 through valve 32). The valve stem 21 is not attached to the gate valve member 12. If it were attached the line or internal valve pressure ($P_v$) would act on valve stem 21 to apply a downward force thereto and tend to maintain valve element 12 to open.

In operation, valve member 12 in valve housing 11 is maintained open until a power failure occurs (or power is deliberately turned off) and then valve member 12 automatically closes to prevent flow of fluid through pipeline 10. In normal operation electrical power is applied to valve 32 and control power fluid from reservoir 25 is pumped by means of pump 27 through accumulator 29, line 30 and valve 32 (in the position thereof shown in FIG. 1) to move piston 14 and valve stem 13 downwardly against the bias of spring 16. In that position valve stem 21 is located at its lowermost position in actuator chamber 20. Upon failure or removal of power to valve 32, valve 32 automatically shifts under the bias of a spring to its other position to block or prevent flow of control fluid through line 30 from accumulator 29 and permit flow of control fluid from the exhaust end of chamber 15 to reservoir 25 through lines 30 and 31. Spring 16 moves piston 14 upwardly in its exhaust stroke forcing power fluid in actuator chamber 15 to flow through conduit 30, valve 32 and conduit 31 to reservoir 25 and causing valve member 12 to close.

Normal operating pump pressure ($P_o$) may be, for example, ($P_r$) or ($P_a$)+1500 psi. In the event the operating fluid pressure ($P_r$) is greater than the internal valve pressure ($P_v$) the valve may be prevented from closing. That is because the ambient pressure ($P_a$) equals operating pressure ($P_r$) and the force due to the hydrostatic head i.e. the difference between the operating pressure and the valve pressure multiplied by the upper piston stem diameter $D_u$ may be greater than the spring load in the piston operator. When that occurs the valve will not close. To ensure closure of the valve the other valve stem 21 balances any unwanted force permitting the spring to close the valve when the ambient pressure is greater than the internal valve pressure. Line 33 and a portion of line 31 connect the power end of actuator chamber 15 to actuator chamber 20 below valve stem 21. As shown in FIG. 1 the diameter $D_l$ of lower valve stem 21 is substantially the same as the diameter $D_u$ of upper valve stem 13; however, the diameter of the lower balancing valve stem may be larger than the diameter of the upper valve stem as shown in the embodiment of FIGS. 2 and 3.

Figure 2:
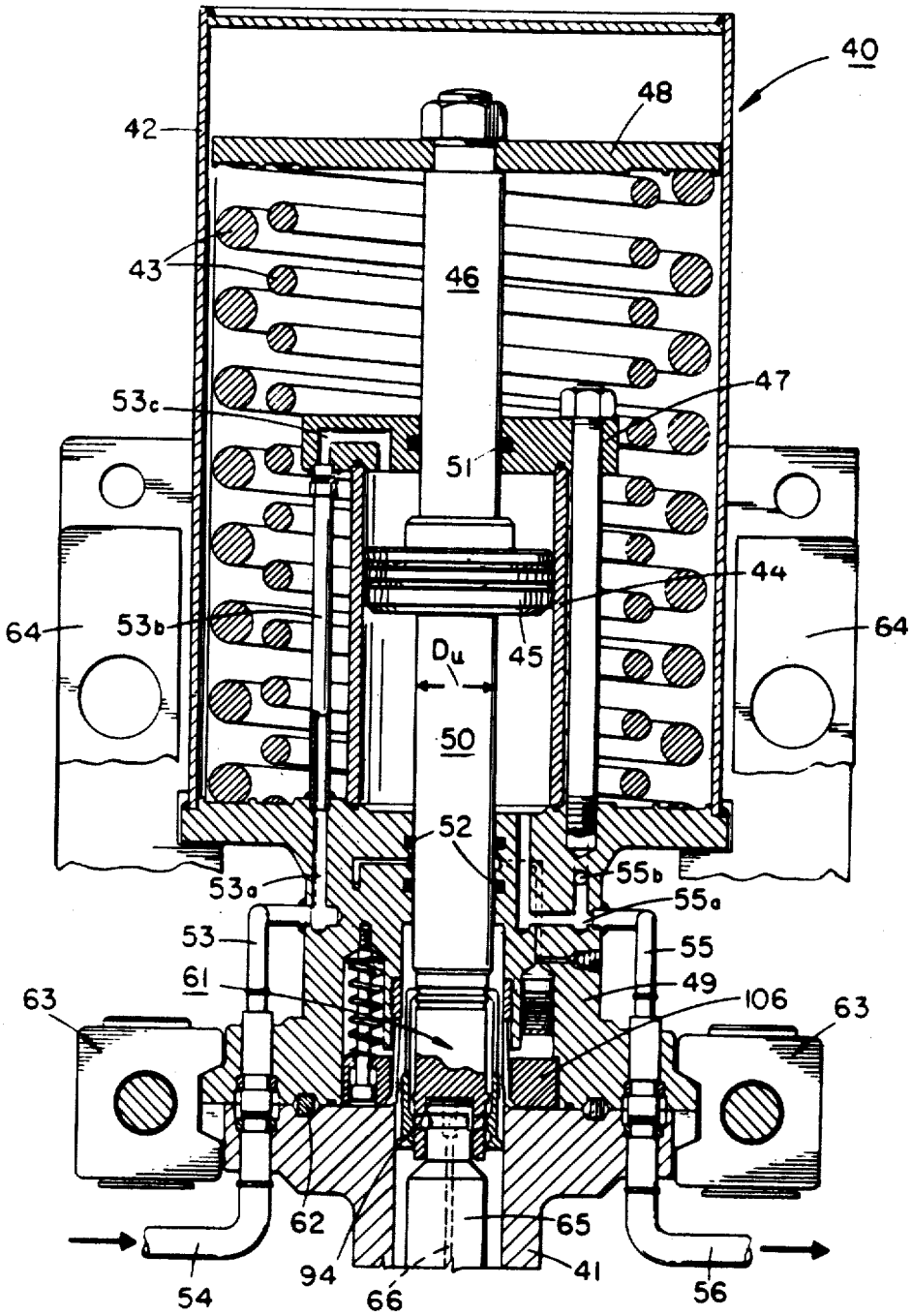
FIGS. 2 and 3 illustrate in detail one embodiment of the valve system of the invention in which the valve operator thereof is removable from the valve system for repair or replacement.
Figure 3:
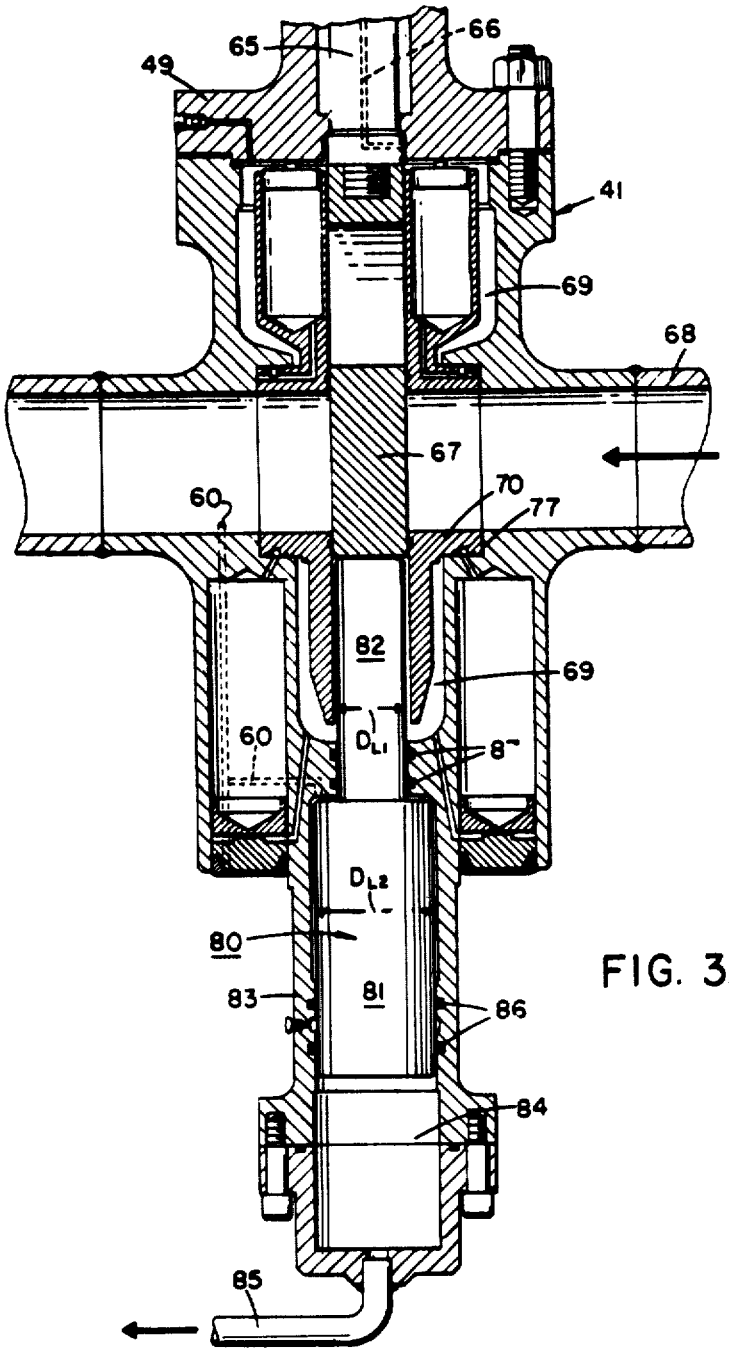

There is shown in FIGS. 2 and 3 a balanced stem fail-safe valve in which the valve operator is removable and replacable. Referring to FIG. 2 a valve operator, generally designated 40, is shown mounted on a valve housing 41. Valve operator 40 includes a housing 42 in which is arranged two concentric springs 43 surrounding a cylinder 44 in which a piston 45 reciprocates. The portion of a piston rod 46 above piston 45 extends through the top end 47 of cylinder 44 and is connected to a spring retainer plate 48. The portion of piston rod 46 below piston 45 forms a valve stem 50. An O-ring seal 51 arranged in top end 47 closes off the space surrounding the upper portion of piston rod 46. Additional O-rings 52 arranged in the bottom portion 49 of valve operator 40 close off the space surrounding valve stem 50. Sealing means other than O-ring seals 51 and 52 may be used. The upper end of a conduit 53 connects into the upper end of cylinder 44 through passageway 53a, conduit 53b and passageway 53c. The lower end of conduit 53 connects into a conduit 54 which extends through the upper end of valve housing 41. Consuit 54 is equivalent to conduit 30 of FIG. 1 and is, therefore, connected to an accumulator, such as 29 through a valve, such as 32. The upper end of another conduit 55 connects into the lower end of cylinder 44 below piston 45 through passageway 55a and also into the interior of housing 42. The lower end of conduit 55 connects into a conduit 56 which extends through the upper end of valve housing 41. Conduit 56 is equivalent to conduit 31 and is therefore, connected to a reservoir, such as 25, through a valve, such as 32.

The remainder of the apparatus for connecting valve operator 40 to valve housing 41, generally indicated at 61, will be described in more detail with reference to FIGS. 4A to 4F. A seal 62 (FIG. 2) seals off fluid flow into or from the interior of valve housing 41 when the valve operator 40 is clamped onto valve housing 41 by clamp 63. Clamp 63 is similar to the clamp connector described and claimed in U.S. patent application Ser. No. 389,055 entitled "Clamp Connector" filed Aug. 16, 1973. Plate member holders 64 are secured on the opposite sides of housing 42 to permit handling of the valve operator by the remotely-operated manipulator. Valve stem 50 relesably attaches to a valve stem 65 in housing 41.

Referring now to FIG. 3 valve stem 65, which contains a fluid passageway 66 extending therethrough, is connected to a gate valve member 67. Valve housing 41 is mounted on a pipe 68. The direction of the flow of fluids in the pipeline is indicated by the arrowed line. Valve member 67 reciprocates in valve chamber 69 and seats in valve seat 69, 70 arranged in valve seat recess 77 as shown. A lower valve stem 80, having a lower larger diameter section 81 and an upper smaller diameter section 82, is arranged in a lower valve housing 83 in which a fluid pressure chamber 84 is formed. A conduit 85, equivalent to conduit 33 of FIG. 1, is connected to conduit 56. The interior of housing 83 contains seals such as O-ring seals 86 which seal off the space between the inner wall of housing 83 and the surface of the lower valve stem section 81. Additional seals 87 seal off the inner wall of housing 83 and the upper stem section 82. A passageway 60 fluidly communicates the line pressure downstream of valve member 67 and valve chamber 84 above seals 86. Valve stem section 82 is not connected to valve member 67.

The operation of the valve system of FIGS. 2 and 3 is the same as the operation of the valve system described with respect to FIG. 1. However, the larger surface of the valve stem section 81 provides a greater counterbalancing force than the substantially same surfaces for the lower and upper valve stems, as described in FIG. 1, would. The diameter, $D_{L2}$ of the lower valve stem section 81 is larger than the diameter $D_u$ of upper valve stem 50. Thus pressure ($P_r$) or ($P_a$) acting on the larger cross-sectional area ($D_{L2}$) of lower valve stem section 81 exerts a greater upward force on valve member 67 than the downward force exerted on valve member 67 resulting from the pressure ($P_r$) or ($P_a$) acting on the smaller cross-sectional area ($D_u$) of upper valve stem 50. When exhaust operating fluid pressure ($P_r$) is less than internal valve pressure ($P_v$) lower valve stem 80, detached from valve member 50, is forced to its lowermost position in chamber 84 by the pressure differential ($P_v$–$P_a$) acting on $D_{L2}$. Passageway 60 balances the upward and downward forces acting on upper diameter section ($D_{L1}$) resulting from pressure ($P_v$).

Figure 4A:
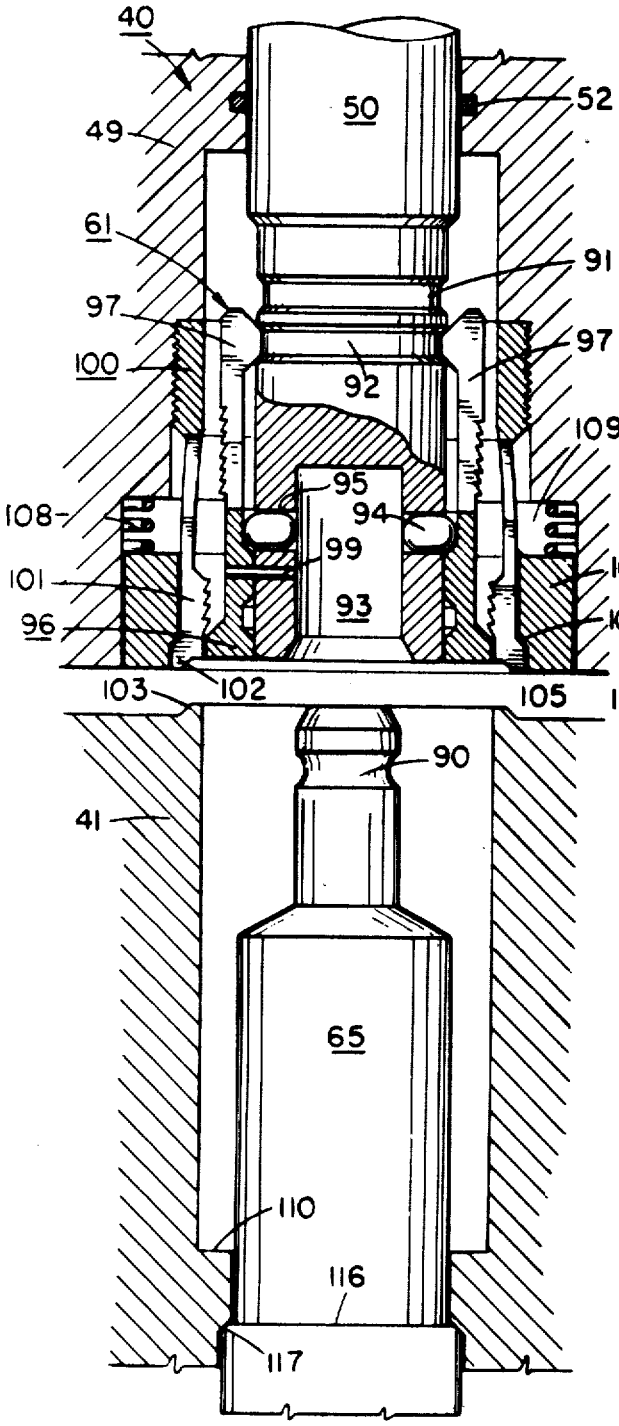
FIGS. 4A to 4F schematically illustrate the steps in replacing the valve operator by means of a manipulator.
Figure 4B:
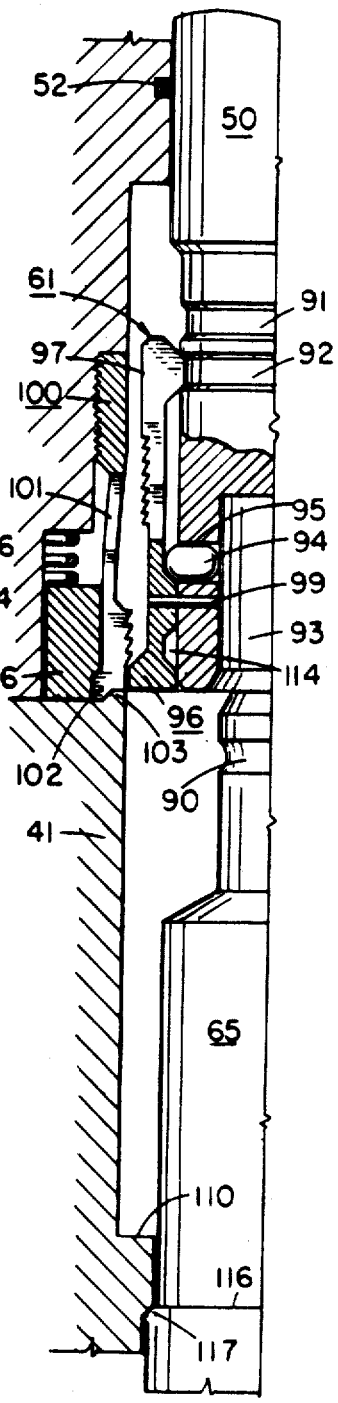
Figure 4C:
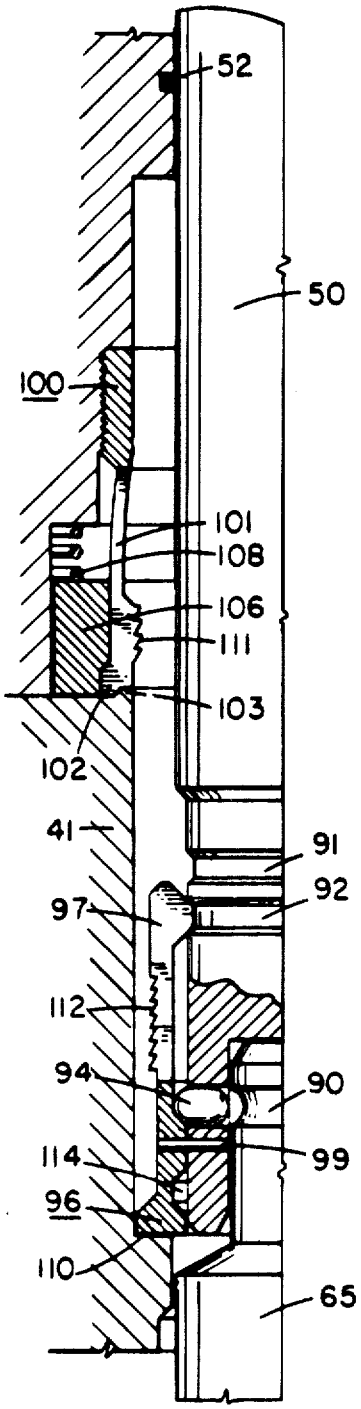

The manner of installing valve operator 40 on valve housing 41 and removing it from valve housing 41 is illustrated in FIGS. 4A to 4F. Referring to FIG. 4A a manipulator, now shown, moves valve operator 40 towards valve housing 41. Valve stem 65 has an annular groove 90 formed at its upper end. The lower end of valve stem 50 contains two annular grooves 91, 92. The end of valve stem 50 forms a cavity 93 into which the upper end of valve stem 65 moves. Locking balls 94 are contained in slots 95 formed in the wall of the cavity 93 and are allowed limited lateral movement. A ring member 96, having spring arms 97 formed at its upper end for engagement with grooves 91 and 92 and having a serrated portion formed along the length thereof, is initially connected to the lower end of valve stem 50 by means of sheat pin 99 as seen in FIGS. 4A, 4B, and 4C. Another ring member 100 is connected to valve operator housing section 49 and contains serrated spring arms 101 on its lower end. Spring arms 101 are formed with a lower stepped portion 102, which mates with a stepped upper surface 103 of valve housing 41, as well as a tapered surface 104 which engages a tapered surface 105 on a piston member 106 which is biased downwardly by spring 108 arranged in chamber 109.

Figure 4D:
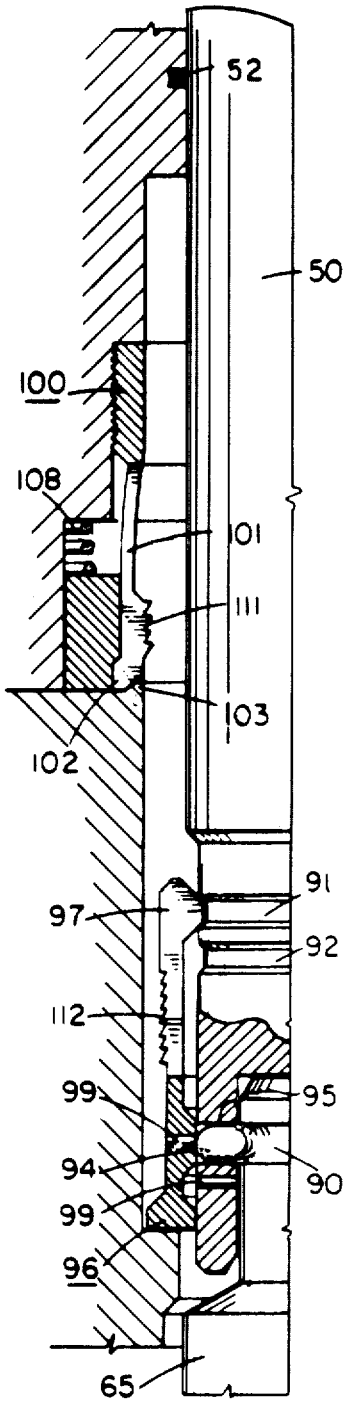

As shown in FIG. 4B the stepped surface 102 has engaged surface 103 and clamp ring 63 (FIG. 2) is set with the components in that position. Valve stem 50 is then operated to open valve member 67 by forcing piston 45 and valve stem 50 downwardly as shown in FIG. 4C, until ring 96 engages shoulder 110 formed on valve housing 41. In that position the valve member is within one-half inch of full stroke open. Referring to FIG. 4D piston 45 and valve stem 50 are moved to full stroke open of the valve member which movement shears pin 99 and moves arms 97 into recess 91. Also, in this position the stem 50 is locked to valve stem 65 by locking balls 94 moving into recess 90. This is the operating position for valve operator 40.

Figure 4E:
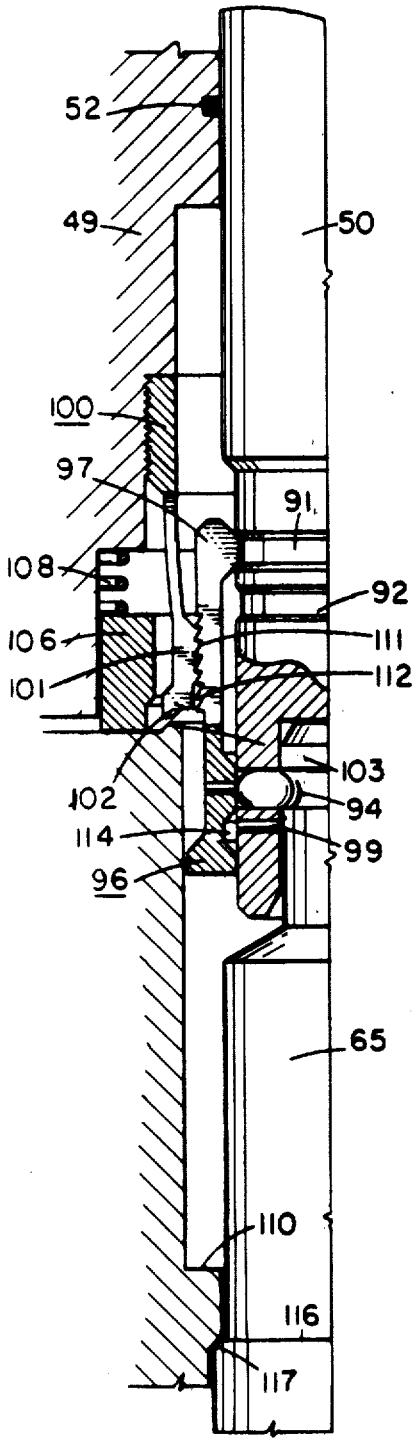
Figure 4F:
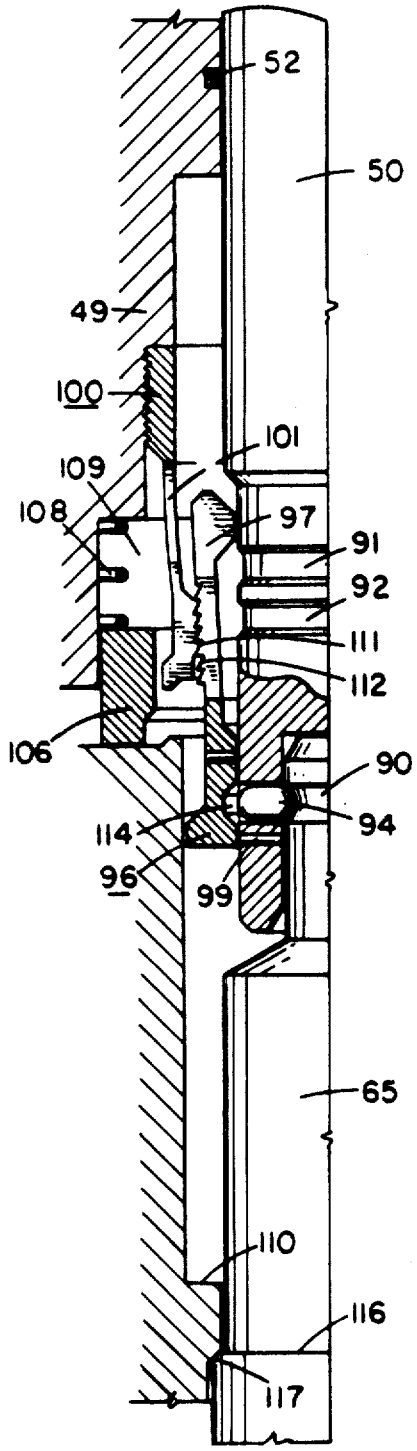

When it is desired to remove valve operator 40 the manipulator releases clamp 63 and then picks up the valve operator housing 42 using plate member holders 64. The lower end of valve operator housing 42 is raised slightly, as shown in FIG. 4E, to free spring arms 101 and permit them to move inwardly. When valve stem 50 and spring arms 97 reach the serrated portion 111 of ring 100 the serrated portion 112 engages the serated portion 11. Further upward movement of valve stem 50 moves spring arms 97 out of groove 91 and moves recess 114 to adjacent balls 94 as shown in FIG. 4F. That position permits balls 94 to move out of the annular groove 90 and release valve stem 50 from valve stem 65. Also, a shoulder 116 on valve stem 65 engages with shoulder 117 on valve housing 41 to prevent further upward movement of valve stem 65 and valve stem 50 is thereby released for removal with valve operator 40.

Figure 5:
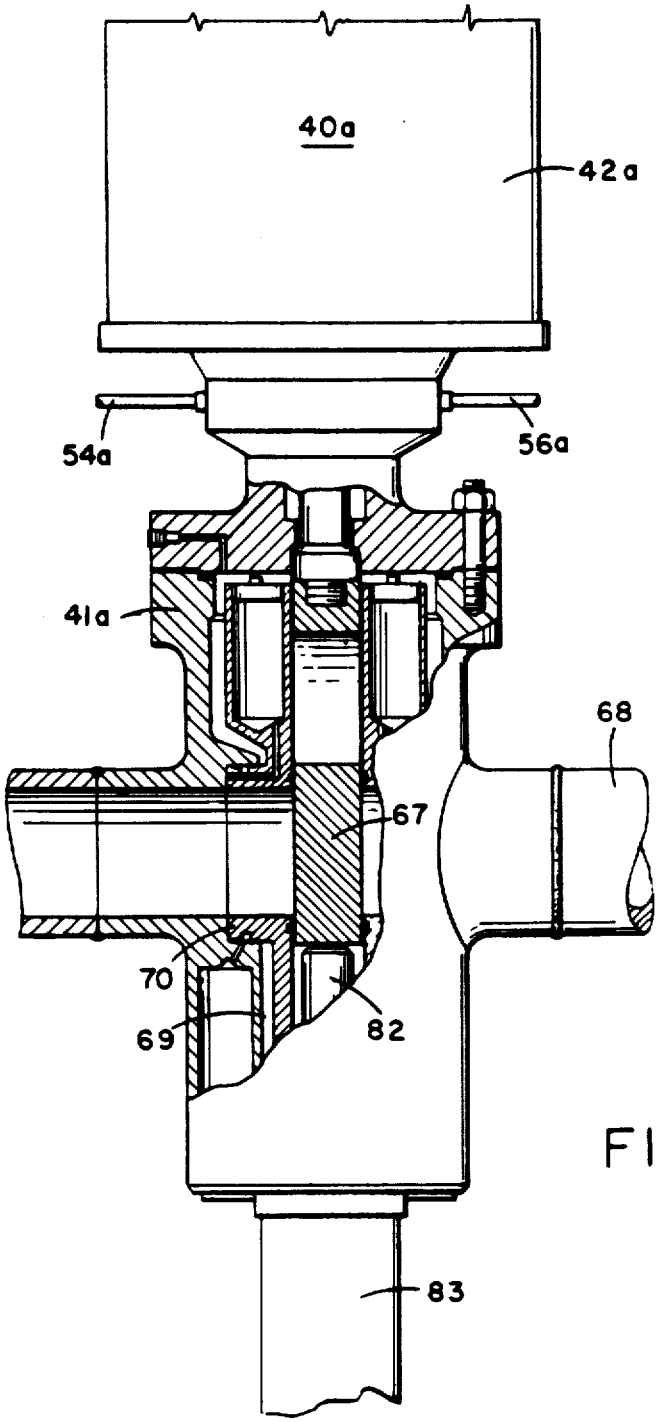
FIG. 5 illustrates another embodiment of the valve system of the invention in which the valve operator is not separately removable from the system.

FIG. 5 shows a modified balanced fail-safe valve system in which the valve operator 40a is not removable. All of the components are the same except the valve operator housing 42a is not releasably connected to valve housing 41a in the embodiment of FIG. 5. Such an arrangement permits direct connection of operating and exhaust conduits 54a and 56a, respectively, to the lower end of housing 42a.

Figure 6:
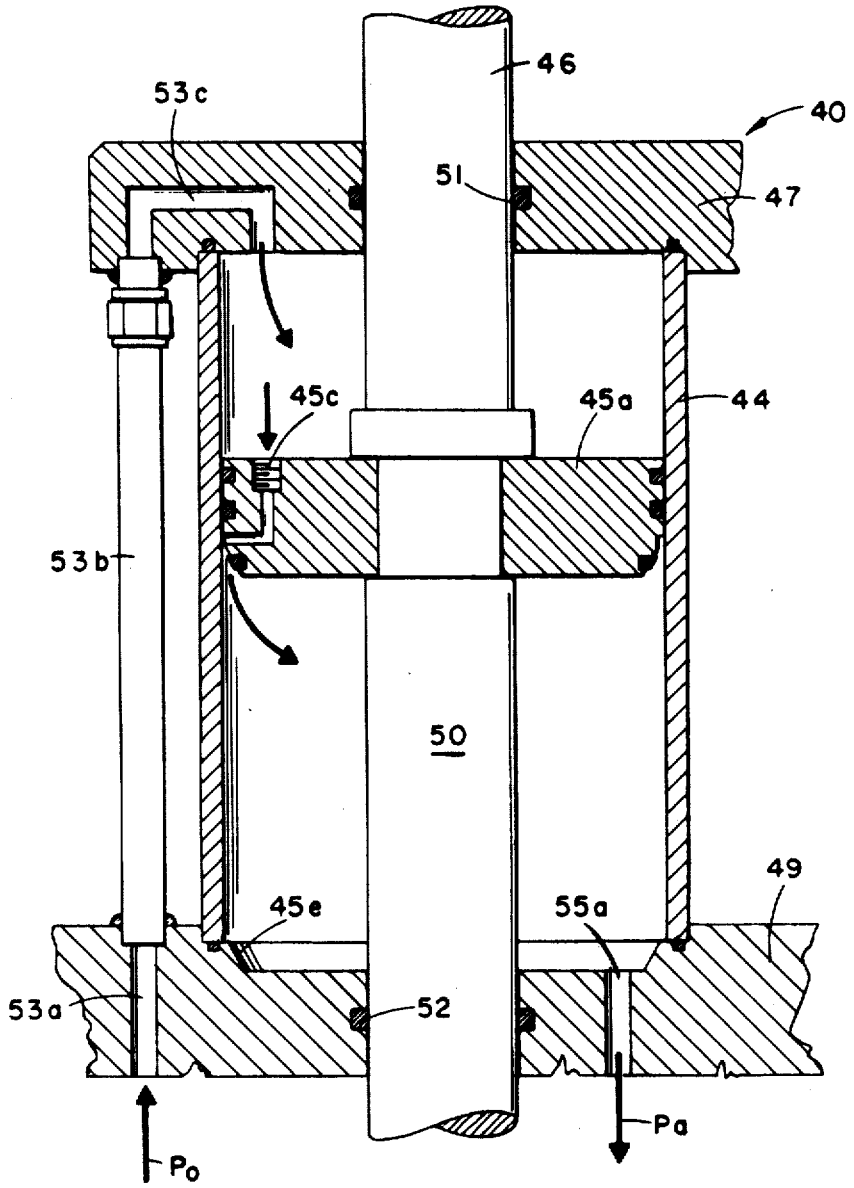
FIG. 6 illustrates a piston by-pass arrangement for use in either embodiment of the valve system.

FIG. 6 shows a modification of the piston-cylinder arrangement of FIG. 2. In FIG. 6 the piston 45a seals with seat 45e only at the end of power stroke of the piston. Also, a by-pass 45c is formed in piston 45a to permit fluid to leak through the piston in its power stroke to permit fluid to be monitored during movement of piston 45a. The upper portion of by-pass 45c is threaded to received varied sized orifices.

Changes and modifications may be made in the specific illustrative emobidments of the invention shown and/or described herein without departing from the scope of the invention as defined in the appended claims.

Having fully described the objects, advantages, apparatus and operation of our invention we claim:

1. A hydraulically operable valve system for use in controlling flow of fluids through a submerged flowline comprising:

a valve housing arranged on said submerged flowline;

a valve chamber arranged in said valve housing;

a valve element movable in said valve chamber between open and closed positions for controlling the flow of fluids through said flowline;

first fluid pressure operable means connected to said valve element for urging said valve element from one to another of said positions of said valve element upon application of fluid pressure to said first fluid pressure operable means;

biasing means arranged in said valve housing for urging said valve element from said other to said one of said positions of said valve element; and second fluid pressure operable means detached from and engagable with said valve element to urge said valve element toward said one position of said valve element upon application of same or about same fluid pressure applied to said first fluid pressure operable means to counterbalance the force applied to said valve element by means of said first pressure operable means.

2. A valve system as recited in claim 1 in which said one position of said valve element being the closed position thereof and said other position of said valve element being the open position thereof.

3. A valve system as recited in claim 2 in which said first fluid pressure operated means comprises:

a first valve stem connected to said valve element;

spring means arranged in said housing for urging said first valve stem and said connected valve element to the open position of said valve element; and said second fluid pressure operable means comprises a second valve stem detached from and engagabeable with said valve element.

4. A valve system as recited in claim 3 including:

a first cylinder having a power end and an exhaust end;

a first piston arranged in said first cylinder and connected to said first valve stem and having power and exhaust strokes;

a second cylinder having a power end;

a second piston arranged in said second cylinder;

means for supplying power operating fluid to said power end of said first cylinder comprising a reservoir at ambient pressure; a pump connected to said reservoir; an accumulator connected to said pump; conduit means connecting said accumulator to said power end of said first cylinder and said reservoir to said exhaust end of said first cylinder and to said power end of said second cylinder; and valve means having one position permitting flow of fluids from said accumulator to said power end of said first cylinder and for permitting flow of fluids from said exhaust end of said first cylinder to said reservoir and having another position permitting flow of fluids from said power end of said first cylinder to said reservoir and the exhaust end of said first cylinder to said reservoir and preventing flow of fluids from said accumulator to said power end of said first cylinder.

5. A valve system as recited in claim 4 including means providing a seal between said first piston and said first cylinder only on the end of said power stroke of said first piston; and means on said first piston to permit leakage of fluid through said first piston during reciprocation thereof in said first cylinder.

6. A valve system as recited in claim 5 in which said biasing means comprises two concentric springs.

7. A valve system as recited in claim 3 including
a first cylinder;
a piston reciprocal in said first cylinder and connected to said first valve stem;
a second cylinder, said second valve stem being arranged in said second cylinder; and
a closed hydraulic system having means for fluidly communicating said first and second cylinders at ambient pressure to balance the opposing forces applied to said valve element by means of the fluid pressure applied to said valve stems.

8. A valve system as recited in claim 7 in which said second valve stem has a larger cross-sectional area than said first valve stem.

9. A hydraulically operable fail-safe valve system for use on a submerged flowline comprising:
a valve housing arranged on said submerged flowline;
a valve chamber arranged in said valve housing;
a valve element movable in said valve chamber between open and closed positions for controlling the flow of fluids through said submerged flowline; a first valve stem connected to said valve element;
a valve operator housing;
a first cylinder arranged in said valve operator housing having a power end and an exhaust end;
a piston having power and exhaust strokes arranged in said first cylinder;
a second valve stem connected to said piston;
means for sealingly locking said valve operator housing to said valve housing;
means for releasably locking said second valve stem to said first valve stem;
biasing means arranged in said valve stem operator housing for urging said second valve stem and said piston and said first valve stem and said valve element from said open position of said valve element to said closed position thereof;
a source of power fluid;
first conduit means arranged in said valve operator and extending to said first cylinder to convey power fluid to said first cylinder for powering said piston in its power stroke;
second conduit means arranged in said valve operator housing and connected to the exhaust end of said first cylinder;
third conduit means arranged in said valve housing connected to a source of power fluid for conveying power fluid to said first conduit;
fourth conduit means arranged in said valve housing for exhausting fluid from said third conduit; said first and third conduits and said second and fourth conduits sealingly engaging when said valve operator housing and said valve housing are locked together;
a second cylinder arranged in said valve housing;
a valve stem piston arranged in said second cylinder detached from and engageable with said valve element;
a source of fluid pressure at the exhaust pressure end of said first cylinder; and
a fifth conduit connecting said second cylinder to said source of fluid pressure at the exhaust end of said first cylinder to balance the fluid pressure force applied to said second valve stem.

10. A hydraulically operable fail-safe valve system for use on a submerged flowline comprising:
a valve housing arranged on said submerged flowline;
a valve chamber arranged in said valve housing;
a valve element movable in said valve chamber between open and closed positions for controlling the flow of fluids through said flowline;
a first valve stem connected to said valve element;
a valve operator housing;
a first cylinder arranged in said valve operator housing having a power end and an exhaust end;
a piston having power and exhaust strokes arranged in said first cylinder;
a second valve stem connected to said piston;
means for sealingly locking said valve operator housing to said valve housing;
means for releasably locking said second valve stem to said first valve stem;
biasing means arranged in said valve operator housing for urging said second valve stem and said piston and said first valve stem and said valve element from said open position of said valve element to said closed position thereof;
a second cylinder arranged in said valve housing;
a valve stem piston arranged in said second cylinder detached from and engageable with said valve element; and
means for fluidly communicating the exhaust end of said first cylinder and said second cylinder to balance the fluid pressure force applied to said second valve stem.

11. A hydraulically operable valve system for use in controlling fluids through a flowline comprising:
a valve housing arranged on said submerged flowline;
a valve chamber arranged in said valve housing;
a valve element movable in said valve chamber between open and closed positions for controlling the flow of fluids through said flowline;
a first cylinder;
a piston reciprocal in said first cylinder;
a first valve stem connected to said piston and to said valve element, application of fluid pressure to said piston moving said valve element from one to another position thereof;
biasing means arranged in said valve housing or urging said valve element from said other to said one position thereof;
a second cylinder;
a second valve stem detached from and engageable with said valve element arranged in said second cylinder; and
means fluidly communicating said first and second cylinder to balance the opposing forces applied to said valve element through fluid pressure applied to said valve stems.

12. A valve system as recited in claim 11 in which said second valve stem has a larger cross-sectional area than said first valve stem.

*13. A valve system for use in controlling flow of fluids through a flowline comprising:*
*a valve housing;*
*a valve chamber arranged in said valve housing;*
*a valve element movable in said valve chamber between open and closed positions thereof for controlling the flow of fluids through said flowline;*
*first fluid pressure operable means connected to said valve element for urging said valve element from one to the other of said positions of said valve element*

*upon application of fluid pressure to said first fluid pressure operable means;*

*biasing means for urging said valve element from said other to said one position of said valve element; and*

*second fluid pressure operable means detached from and engageable with said valve element to urge said valve element toward said one position of said valve element upon application of the same or about the same fluid pressure applied to said first fluid pressure operable means to counterbalance the force supplied to said valve element by said first fluid pressure operable means.*

*14. A valve system as recited in claim 13 in which said one position of said valve element being the closed position thereof and said other position of said valve element being the open position thereof.*

*15. A valve system as recited in claim 14 in which said first fluid pressure operable means includes a first valve stem connected to said valve element and a piston connected to said first valve stem; and*

*said second fluid pressure operable means includes a second valve stem detached from and engageable with said valve element.*

*16. A valve system as recited in claim 15 including a first actuator chamber, said piston being arranged in said first actuator chamber for reciprocation therein; seal means on said piston engageable with said first actuator chamber only at the end of the power stroke of said piston; and means on said piston to permit leakage of fluid through said piston during reciprocation thereof in said first actuator chamber.*

*17. A valve system as recited in claim 15 in which said second valve stem has a larger cross-sectional area than said first valve stem.*

*18. A valve system as recited in claim 15 including a first actuator chamber, said piston being arranged in said first actuator chamber; a second actuator chamber, said second valve stem being arranged in said second actuator chamber; and conduit means fluidly communicating the exhaust end of said first actuator chamber and said second actuator chamber to balance the fluid pressure force applied to said first valve stem.*

*19. A valve system as recited in claim 18 including means for supplying power fluid to the power end of said first actuator chamber and for fluidly communicating the exhaust end of said first actuator chamber and said second actuator chamber, said means comprising*

*a reservoir at ambient pressure;*

*a pump connected to said reservoir;*

*an accumulator connected to said pump; conduit means connecting said accumulator to the power end of said first actuator chamber and said reservoir to the exhaust end of said first actuator chamber and to said second actuator chamber; and*

*valve means having one position permitting flow of fluids from said accumulator to the power end of said first actuator chamber and for permitting flow of fluids from the exhaust end of said first actuator chamber to said reservoir and having another position permitting flow of fluids from the power end of said first actuator chamber to said reservoir and the exhaust end of said first actuator chamber to said reservoir and preventing flow of fluids from said accumulator to the power end of said first actuator chamber.*

*20. A valve system as recited in claim 19 in which said first valve stem comprises two parts and said valve system includes means for releasably locking said parts together.*

*21. A valve system as recited in claim 15 in which said first valve stem comprises two parts and said valve system includes;*

*means for releasably locking said parts together;*

*first conduit means extending to said first actuator chamber to convey power fluid thereto for powering said piston in its power stroke;*

*second conduit means connected to the exhaust end of said first actuator chamber;*

*third conduit means connected to a source of power fluid for conveying power fluid to said first conduit means;*

*fourth conduit means for exhausting fluid from said second conduit means;*

*said first and third conduit means and said second and fourth conduit means sealingly engaging when said two parts of said first valve stem connect together; and*

*a fifth conduit means connecting said first actuator chamber to said second actuator chamber to balance the pressure force applied to said first valve stem.*

*22. A hydraulically operable valve system for use in controlling flow of fluids through a flowline comprising:*

*a valve housing;*

*a valve chamber arranged in said valve housing;*

*a valve element movable in said valve chamber between open and closed positions;*

*first fluid pressure operable means including a first valve stem connected to said valve element for urging said valve element from one to another of said positions of said valve element;*

*biasing means for urging said valve element from said other to said one position of said valve element; and*

*second fluid pressure operable means including a second valve stem detached from and engageable with said valve element to urge said valve element toward said one position of said valve element upon application of fluid pressure to said second valve stem, said pressure being the same or about the same as the pressure applied to said first valve stem to counterbalance the force applied to said first valve stem.*

*23. A hydraulically operable valve system for use in controlling fluids through a flowline comprising:*

*a valve housing;*

*a valve chamber arranged in said valve housing;*

*a valve element movable in said valve chamber between open and closed positions for controlling the flow of fluids through said flowline;*

*a first cylinder;*

*a piston reciprocal in said first cylinder;*

*a first valve stem connected to said piston and to said valve element, application of fluid pressure to said piston moving said valve element from one to another position thereof;*

*biasing means for urging said valve element from said other to said one position thereof;*

*a second cylinder;*

*a second valve stem detached from and engageable with said valve element arranged in said second cylinder; and*

*means fluidly communicating said first and second cylinders to balance the opposing forces applied to said valve element through fluid pressure applied to said valve stems.*

*24. A valve system as recited in claim 23 in which said second valve stem has a larger cross-sectional area than said first valve stem.*

* * * * *